(12) United States Patent
Xiang et al.

(10) Patent No.: US 11,686,874 B2
(45) Date of Patent: Jun. 27, 2023

(54) TRAJECTORY OPTIMIZATION METHOD AND DEVICE FOR ACCURATELY DEPLOYING MARINE SENSORS UNDER WATER

(71) Applicant: HUAZHONG UNIVERSITY OF SCIENCE AND TECHNOLOGY, Hubei (CN)

(72) Inventors: Gong Xiang, Hubei (CN); Xianbo Xiang, Hubei (CN); Donglei Dong, Hubei (CN); Shaolong Yang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 120 days.

(21) Appl. No.: 17/322,930

(22) Filed: May 18, 2021

(65) Prior Publication Data

US 2022/0244417 A1 Aug. 4, 2022

(30) Foreign Application Priority Data

Jan. 26, 2021 (CN) .......................... 202110101658.1

(51) Int. Cl.
*G01V 1/38* (2006.01)
(52) U.S. Cl.
CPC .......... *G01V 1/3843* (2013.01); *G01V 1/3817* (2013.01)

(58) Field of Classification Search
CPC ....... G01V 1/3843; G01V 1/3817; G05D 1/10
See application file for complete search history.

(56) References Cited

U.S. PATENT DOCUMENTS

2016/0306059 A1* 10/2016 Davies ................ G01V 1/3843

OTHER PUBLICATIONS

Yonghwan Kim et al., "Motion Dynamics of Three-Dimensional Bodies Falling Through Water," 17th IWWWFB, pp. 1-6.

(Continued)

*Primary Examiner* — Ian J Lobo
(74) *Attorney, Agent, or Firm* — JCIPRNET (57) ABSTRACT

The disclosure discloses a trajectory optimization method and device for accurately deploying marine sensors under water. The method includes the following steps. 1. Randomly select N sets of initial control variables within a range. 2. Input all of N sets of $x_i$ to the sensor's underwater glide kinematics and dynamics models, and calculate the smallest distance between N actual deployment positions and target deployment positions. 3. Determine whether the number of iterative operations is less than the preset value, if yes, perform global random walk and local random walk on N sets of $x_i$, obtain N sets of $x_i$ again, and return to step 2; otherwise, go to step 4. 4. Output the control variable $x_i$ corresponding to $\Delta s(x)_{nminmin}$ and the corresponding trajectory as the optimal control variable and optimal trajectory. The disclosure can improve the accuracy of prediction on the underwater three-dimensional trajectory of the marine sensor.

20 Claims, 4 Drawing Sheets (56) References Cited

OTHER PUBLICATIONS

Gong Xiang et al., "Numerical study on the trajectory of dropped cylindrical objects," Ocean Engineering, vol. 130, Jan. 15, 2017, pp. 1-9.
Hagbart S. Alsos et al., "3D motion dynamics of axisymmetric bodies falling through water," Ocean Engineering, No. 169, Oct. 1, 2018, pp. 442-456.

* cited by examiner

TRAJECTORY OPTIMIZATION METHOD AND DEVICE FOR ACCURATELY DEPLOYING MARINE SENSORS UNDER WATER

CROSS-REFERENCE TO RELATED APPLICATION

This application claims the priority benefit of China application Ser. No. 202110101658.1, filed on Jan. 26, 2021. The entirety of the above-mentioned patent application is hereby incorporated by reference herein and made a part of this specification.

BACKGROUND

Technical Field

The disclosure belongs to the field of marine engineering and technology, and specifically relates to the field of deploying marine sensors under water, and more specifically, relates to a trajectory optimization method and device for accurately deploying marine sensors under water.

Description of Related Art

Most of the marine environment detection sensors are cylindrical or approximately cylindrical devices. They are commonly used in the field of marine monitoring and observation. They can measure and provide various marine environmental data. They are not only used in marine scientific research, but also serve as a crucial source of important data in the application of marine resource development. Taking the conductivity temperature depth (CTD) as an example, the CTD can be adapted to a variety of observation methods including fixed-point self-contained observation, disposable probe observation, etc., and obtain real-time high-precision physical environmental parameters such as temperature, raw data of conductivity/salinity and pressure/depth while carrying out investigation at the sea area water body scene. Therefore, CTD is currently one of the most commonly used instruments in physical oceanographic surveys. However, due to the lack of stable and reliable underwater point-to-point deploying technology directed for the CTD, it is difficult to ensure the accuracy of the deployment position of the CTD and the field observation range.

After the marine environment detection sensor is deployed, during the underwater gliding motion, the sensor may rotate around the axis itself and be affected by water. The motion and dynamic model for the marine environment detection sensor can be established to accurately predict the underwater motion trajectory of the marine environment detection sensor, which is also a basis for trajectory optimization for carrying out the deployment operation.

The paper "Motion Dynamics of Three-dimensional Bodies Falling Through Water" (Conference Paper "17th IWWWFB", 2002, 21-81) discloses a three-dimensional motion model of falling objects without axial rotation. In the paper, external forces such as additional mass force and viscous force are taken into consideration in the three-dimensional space, but the lifting force that may be caused by the cylindrical axial rotation or the asymmetric vortex shedding is ignored. The paper "Numerical study on the trajectory of dropped cylindrical objects" (Ocean Engineering, 2017, 130: 1-9) discloses a three-dimensional motion model that takes into consideration of axial rotation of a cylinder, and the paper is used to simulate the underwater gliding motion trajectory of a cylinder. However, the lateral movement caused by asymmetric vortex shedding is ignored, and when dealing with the lifting force generated by the axial rotation of the cylinder, the ideal flow assumption is adopted to estimate based on the potential flow theory.

Neither of the two three-dimensional motion models calculates the lateral force caused by asymmetric vortex shedding. In particular, when the flow velocity of a cylinder is large, the lateral force caused by the asymmetric vortex is very large and the lateral motion will be very significant. As a result, the lateral dimension information is lost during trajectory prediction, resulting in huge prediction errors. Moreover, in the second file, the ideal flow assumption is adopted when calculating the lifting force generated by the axial rotation of the cylinder, ignoring the viscous effect of water, which makes the estimated lifting force larger than the actual value.

In addition, the above two comparative files only predict the trajectory of the cylinder without optimizing the trajectory. Therefore, the quality and accuracy of the deployment of marine environment detection sensor are not guaranteed when the task is performed under water.

SUMMARY

Based on the above shortcomings or needs of improvement for the related art, the disclosure completes high-precision point-to-point underwater deployment operations for marine sensors, and provides a trajectory optimization method and device for accurately deploying marine sensors under water, which conduct random update globally and random update locally directed at multiple input control variables. In the meantime, the multiple sets of multiple input control variables are simultaneously updated and compared in every iterative operation, thereby realizing trajectory optimization. The purpose of the disclosure is to improve the accuracy of three-dimensional trajectory prediction for underwater marine sensors, achieve trajectory optimization for specific point-to-point deployment operations, thereby realizing underwater marine sensor deployment task with high accuracy.

In order to achieve the above purpose, according to one aspect of the disclosure, a trajectory optimization method for accurately deploying a marine sensor under water is provided, which includes the following steps:

Step 1: According to the preset search range $x_{min} \leq x \leq x_{max}$, N sets of values are randomly selected for the initial control variables $x=(U_0, V_0, W_0, \omega_{x0}, \omega_{y0}, \omega_{z0}, \phi_0, \theta_0, \psi_0)$, denoted as $x_i$. Specifically, $i=1, 2 \ldots, N$, $x_{min}$, $x_{max}$ are the lower limit and upper limit of the search range. $U_0$, $V_0$ and $W_0$ are the components of the initial linear velocity in the x-, y-, z-directions in the local coordinate system. $\omega_{x0}$, $\omega_{y0}$ and $\omega_{z0}$ are the components of the initial angular velocity $\omega_0$ in the x-, y-, z-directions in the local coordinate system. ($\phi_0$, $\theta_0$, $\psi_0$) are the initial Euler angles of the sensor.

Step 2: In the n-th iterative operation, all N sets of $x_i$ are input into the sensor's underwater glide kinematics and dynamics model, and N actual deployment positions are calculated. Then, the internal minimum deployment error $\Delta s(x_i)_{min}$ between target deployment position and the actual deployment position of each set of $x_i$ in the current iterative operation is calculated. Thereafter, the minimum distances corresponding to the N sets of $x_i$ are compared with each other. The minimum value is taken as the global minimum deployment error $\Delta s(x)_{nminmin}$ of this iterative operation, wherein:

When n=1, $\Delta s(x_i)_{1min}=\Delta s(x_i)_1$, $\Delta s(x)_{1minmin}$ is denoted as follows, and turn to step 3:

$$\Delta s(x)_{1minmin}=\text{Min}\{\Delta s(x_1)_1, \Delta s(x_2)_1, \ldots \Delta s(x_N)_1\};$$

When n>1, $\Delta s(x_i)_{nmin}=\text{Min}\{\Delta s(x_i)_n, \Delta s(x_i, \Delta s(x_i)_{(n-1)min}\}$ is taken, and then turn to step 3. Under the circumstances, $$\Delta s(x)_{nminmin}=\text{Min}\{\Delta s(x_1)_{nmin}, \Delta s(x_2)_{nmin} \ldots \Delta s(x_N)_{nmin}\}$$

Specifically, the subscript n represents the current iteration operation steps, $\Delta s(x_i)_n$ represents the error distance between the actual deployment position and the target deployment position in the n-th step of iterative operation in the i-th set. The subscript min is the mark for minimum value in the set, and the subscript minmin is the mark for minimum value between the sets. $\Delta s(x_i)_{nmin}$ represents the internal minimum deployment error in the n-th step of iterative operation in the i-th set, and $\Delta s(x)_{nminmin}$ represents the global minimum deployment error in the n-th step of iterative operation.

Step 3: It is determined whether n is less than the preset maximum number of iteration steps $N_0$, if yes, a global random walk is performed, N sets of $x_i$ are updated, and then a local random walk is performed on the above updated N sets of $x_i$ according to the preset probability. The N sets of $x_i$ are obtained again, and return to step 2; otherwise, go to step 4.

Step 4: The control variable x corresponding to $\Delta s(x)_{nminmin}$ and the corresponding trajectory are output as the optimal control variable and optimal trajectory.

Another technical problem to be solved by the disclosure mainly includes the inaccurate motion prediction on the lateral motion when the marine sensor performs underwater gliding motion along the axial direction, and the inaccurate motion prediction is firstly caused by the loss of lateral dimension motion information when the marine sensor performs underwater gliding motion without rotating in the axial direction. Secondly, when the marine sensor performs underwater gliding motion with rotating in the axial direction the lifting force value obtained from the inaccurate motion prediction is greater than the actual value, and the accuracy of deployment position and operation range is low.

To achieve the above purpose, furthermore, in step 2, the kinematics model of the sensor's underwater gliding motion is as follows.

$$\dot{U} = \frac{1}{m}[(G-B)\sin\theta + F_{dx} + F_{lx}] - W\omega_y + V\omega_z + L_G(\omega_y^2 + \omega_z^2)$$

$$\dot{V} = \frac{1}{m}[-(G-B)\cos\theta\sin\phi + F_{dy} + F_{ly} + F_{ey}] - U\omega_z - L_G\dot{\omega}_z$$

$$\dot{W} = \frac{1}{m}[-(G-B)\cos\theta\cos\phi + F_{dz} + F_{lz} + F_{ez}] + U\omega_y + L_G\dot{\omega}_y$$

$$\dot{\omega}_y = \frac{1}{J_y}(M_{ly} + M_{dy} + M_{ey} + M_{GBy} + mL_G\dot{W} - mL_GU\omega_y)$$

$$\dot{\omega}_z = \frac{1}{J_z}(M_{lz} + M_{dz} + M_{ez} - mL_G\dot{V} - mL_GU\omega_z)$$

In the formula, $\dot{U}$, $\dot{V}$ and $\dot{W}$ are the acceleration components of the sensor in the x-, y-, z-directions in the local coordinate system; $\dot{\omega}_y$ and $\dot{\omega}_z$ are the angular acceleration components of the sensor in the y-, z-directions in the local coordinate system.

m is the mass of the sensor, U, V, and W are the velocity components of the sensor in the x-, y-, z-directions in the local coordinate system. $\omega_x$, $\omega_y$ and $\omega_z$ are the angular acceleration components of the sensor in the x-, y-, z-directions in the local coordinate system. $\phi$, $\theta$, and $\psi$ are the roll, pitch and yaw angles of the sensor in the local coordinate system. $J_y$ and $J_z$ are the moment of inertia of the sensor with respect to the y-axis and z-axis, respectively. B is the buoyancy force of the sensor. $M_{GBy}$ is the hydrostatic moment caused by the relative offset $L_G$ between the buoyancy center B and the gravity center G. $F_e$ and $M_e$ are the hydrodynamic force and moment of the sensor. $F_l$ and $M_l$ are the lifting force and torque received by the sensor. $F_d$ and $M_d$ are the drag force and torque received by the sensor. The subscripts x, y, z indicate that the corresponding parameter is the component on the corresponding coordinate axis.

There is a relationship between the angular velocity obtained through the conversion rule for the local coordinate system and the global coordinate system based on the Euler angle and the Euler angle:

$$\begin{bmatrix} \omega_x \\ \omega_y \\ \omega_z \end{bmatrix} = \begin{bmatrix} -\dot{\psi}\sin(\theta) \\ \dot{\psi}\sin(\phi)\cos(\theta) \\ \dot{\psi}\cos(\phi)\cos(\theta) \end{bmatrix} + \begin{bmatrix} 0 \\ \dot{\theta}\cos(\phi) \\ -\dot{\theta}\sin(\phi) \end{bmatrix} + \begin{bmatrix} \dot{\phi} \\ 0 \\ 0 \end{bmatrix}$$

Specifically, $\dot{\psi}$, $\dot{\theta}$ and $\dot{\phi}$ are the change rate of the yaw angle $\psi$, the pitch angle $\theta$ and the roll angle $\phi$ that varies with time.

Furthermore, the hydrodynamic forces in the y and z directions are calculated by the following expressions:

$$F_{ey} = \dot{V}m_{22} - \dot{\omega}_y m_{24} - UVM_{22}(x_t) + U\omega_z x_t M_{22}(x_t)$$

$$F_{ez} = \dot{W}m_{33} - \dot{\omega}_z m_{35} - UVM_{33}(x_t) + U\omega_y x_t M_{33}(x_t)$$

The hydrodynamic torques in the y and z directions are calculated according to the following formula:

$$M_{ey} = -\dot{W}m_{35} - \dot{\omega}_y m_{55} - UW[m_{33} + x_t mM_{33}(x_t)] + U\omega_y [m_{35} - (x_t)^2 M_{33}(x_t)]$$

$$M_{ez} = -\dot{V}m_{26} - \dot{\omega}_z m_{66} - UV[m_{22} + x_t M_{22}(x_t)] + U\omega_z [m_{26} - (x_t)^2 M_{22}(x_t)]$$

In the formula, $m_{22}$, $m_{24}$, $m_{26}$, $m_{33}$, $m_{35}$, $m_{55}$ and $m_{66}$ are the three-dimensional additional mass coefficients of the marine sensor, and $M_{22}(x_t)$ and $M_{33}(x_t)$ respectively represent the two-dimensional additional mass coefficients of the effective trailing edge in the y and z directions. $x_t$ is the longitudinal position of the effective trailing edge. For a sensor with a tip, $M_{33}(x_t)=0$, $M_{22}(x_t)=0$. For a marine sensor with two blunt ends, $M_{33}(x_t)\neq 0$, $M_{22}(x_t)\neq 0$.

Further, the drag force and torque are generated by the relative translational movement of the sensor in contact with water, and the axial drag force $F_{dx}$ is calculated as follows:

$$F_{dx} = \begin{cases} -C_1\pi D\sqrt{v\rho^2 L}\, U\sqrt{|U|} - \frac{1}{8}\rho\pi C_{dt}D^2 U|U|, & \text{"Laminar flow"} \\ -C_2\frac{1}{2}\rho\pi DLU^2 - \frac{1}{8}\rho\pi C_{dt}D^2 U|U|, & \text{"Transition flow"} \\ C_3\frac{1}{2}\rho\pi DLU^2 - \frac{1}{8}\rho\pi C_{dt}D^2 U|U|, & \text{"Turbulence"} \end{cases}$$

In the expression, D is the cross-sectional diameter of the sensor, v is the kinematic viscosity of water, $\rho$ is the density of water, $C_{dt}$ is the tangential shape drag coefficient of the sensor, $C_1$, $C_2$, and $C_3$ are the shape drag coefficient of the sensor when there are laminar flow, transition flow and turbulence, L is the length of the sensor.

The lateral drag forces $F_{dy}$ and $F_{dz}$ in the y and z directions are calculated as follows:

$$F_{dy} = \frac{1}{2}\rho C_{dy}D \int_{-0.5L}^{0.5L} -(V + \omega_z x)|V + \omega_z x|dx$$

$$F_{dz} = \frac{1}{2}\rho C_{dz}D \int_{-0.5L}^{0.5L} -(W - \omega_y x)|W - \omega_y x|dx$$

The resistance moments $M_{dy}$ and $M_{dz}$ caused by the lateral drag force are calculated as follows:

$$M_{dy} = \frac{1}{2}\rho C_{dz}D \int_{-0.5L}^{0.5L} x(W - \omega_y x)|W - \omega_y x|dx$$

$$M_{dz} = -\frac{1}{2}\rho C_{dy}D \int_{-0.5L}^{0.5L} x(V + \omega_z x)|V + \omega_z x|dx$$

Specifically, $C_{dy}$ and $C_{dz}$ are respectively the drag coefficients in the y and z directions.

Further, if the marine sensor itself does not rotate around the axis, the lifting force $F_l$ and the moment $M_l$ are the lateral forces that are mainly caused by the asymmetry of the wake vortex distribution during the flow of water laterally crossing the sensor. If the sensor itself rotates, the water flow circulates laterally and generates pressure difference between the two sides of the sensor, which forms the lifting force.

The lifting force that is generated when the sensor does not rotate in the axial direction is caused by the asymmetry of the wake vortex distribution. The lifting forces are calculated as follows:

$$F_{ly} = \frac{1}{2}\rho D \int_{-0.5L}^{0.5L} (W - \omega_y x)C_l(x)dx$$

$$F_{lz} = -\frac{1}{2}\rho D \int_{-0.5L}^{0.5L} (V + \omega_z x)C_l(x)dx$$

$$M_{ly} = \frac{1}{2}\rho D \int_{-0.5L}^{0.5L} x(V + \omega_z x)C_l(x)dx$$

$$M_{lz} = \frac{1}{2}\rho D \int_{-0.5L}^{0.5L} x(W - \omega_y x)C_l(x)dx$$

Specifically, the lifting force coefficient $C_l(x)$ is calculated as follows:

$$C_l(x) = \begin{cases} KC_{La}\sin[\pi St(t' - 8)], & t' > 8 \\ 0, & t' \leq 8 \end{cases}$$

In the expression, $St=f_v D/V_a$ is the Strouhal number, $f_v$ is the vortex shedding frequency, $V_a$ is the cross-flow velocity, $K=\pm 1$ reflects the random behavior of the lifting direction during gliding, $C_{La}$ is the lift constant, and the time coefficient $t'$ is calculated as follows.

$$t' = \frac{s(x)}{R} - 0.351$$

In the expression, s(x) is the displacement in the y direction when water flows around the cross section of the sensor, and R is the radius of the cross section of the sensor.

The lifting force and moment during axial rotation are calculated as follows:

$$F_{ly} = \frac{1}{2}\rho DW \int_{-0.5L}^{0.5L} C'_l(x)(W - \omega_y x)dx$$

$$F_{lz} = -\frac{1}{2}\rho DV \int_{-0.5L}^{0.5L} C'_l(x)(V + \omega_z x)dx$$

$$M_{ly} = \frac{1}{2}\rho DV \int_{-0.5L}^{0.5L} C'_l(x)(V + \omega_z x)xdx$$

$$M_{lz} = \frac{1}{2}\rho DC'_l(x)W \int_{-0.5L}^{0.5L} (W - \omega_y x)xdx$$

Specifically, the lifting force coefficient $C'_l(x)$ is calculated as follows:

$$C'_l(x) = \begin{cases} \frac{\omega_x D}{V_a}, & \frac{\omega_x D}{V_a} \leq 8 \\ 8 + 0.12\left(\frac{\omega_x D}{V_a} - 8\right), & \frac{\omega_x D}{V_a} > 8 \end{cases}.$$

Furthermore, the sensor in the local body coordinate system is an axisymmetric slender body, and the change of the initial roll angle will not affect the movement of the slender body. Therefore, the initial roll angle and the initial immersion depth are as follows:

$\phi_0=0$ $d=-L/2\sin(\theta_0)$

Thus, the initial control variable is simplified as $x=(U_0, V_0, W_0, \omega_{x0}, \omega_{y0}, \omega_{z0}, \theta_0, \psi_0)$, and L represents the length of the sensor.

In order to achieve an efficient trajectory optimization algorithm for optimizing the target function, the algorithm has flexible iteration steps, which can be large or small, and thus being able to be free from the limitation of single step length, making the optimal solution search efficient. Further, in step 3, a global random walk is performed through Lévy flight, and global update is performed for N sets of control parameters x, as shown in the following formula:

$x_i^{n+1}=x_i^n+\alpha \otimes \text{Lévy}(s,\lambda)$

In the formula, $\alpha=a_0(x_j^t-x_i^t)$, $a_0$ is the preset constant, $x_j$ represents the j-th set of control parameters that is randomly generated, s represents the step length of the iterative operation, $\otimes$ stands for item-based multiplication, and $\lambda$ is the exponent of the Lévy distribution.

Further, after the global update in step 3, each set of control parameters $x_i$ has the probability of $p_a \in (0,1)$ to be locally updated. The update method of the local random walk is shown in the following formula:

$x_i^{n+1}=x_i^{n+1}+\epsilon \cdot (x_p^{n+1}-x_q^{n+1})$, $p,q=1,2,\ldots N$

Specifically, $x_p$ and $x_q$ are two random solutions, $\epsilon$ conforms to the uniform distribution of the interval [0,1], and the superscript n+1 is the number of iterations in the next step.

In order to achieve the above purpose, according to another aspect of the disclosure, a computer-readable/writable storage medium is provided, the computer-readable/ writable storage medium stores a computer program. When the computer program is executed, the following steps are implemented including:

Step 1: randomly generate values for N sets of initial control variables such as velocity, accelerations and orientations within a certain search range. Input all of N sets of xi to the sensor's underwater glide kinematics and dynamics models, and calculate the smallest distance between N actual deployment positions and target deployment positions. 3. The disclosure can improve the accuracy of prediction on the underwater three-dimensional trajectory of the marine sensor.

Step 2: input the selected N sets of initial control variables into the sensor's underwater glide kinematics model.

Step 3: calculate the smallest distance between N actual deployment positions and target deployment positions.

Step 4: determine whether the number of iterative operations is larger than the pre-set value, if yes, output the trajectory and the corresponding control variable as the optimal trajectory and optimal control variable. Otherwise, perform global random walk and local random walk on N sets of control variable, obtain N sets of control variable again, and return to step 2.

Step 5: save the optimal trajectory and optimal control variable such as initial velocity, acceleration and orientation output in step 4 into the computer-readable/writable storage medium.

In order to achieve the above purpose, according to another aspect of the disclosure, a trajectory optimization device for accurately deploying a marine sensor under water is provided, which includes the computer-readable/writable storage medium and a processor and the computer-readable/writable storage medium is able to store the computer program and the data output by the execution of the computer program, the processor is used for calling and processing computer programs stored in the computer-readable storage medium. Once the computer program is called, it starts to solve the sensor's underwater glide kinematics model, output the underwater trajectory of the sensor and the deployment distance error. Finally, the optimal trajectory and optimal control variable such as initial velocity, acceleration and orientation can be obtained by sequential global and local random updates for control variable such as the initial velocity, acceleration and orientation.

In general, compared with the related art, the above technical solutions conceived in the disclosure can achieve the following advantageous effects:

1. The trajectory optimization algorithm designed by the disclosure greatly increases the number of main initial control variables, so that the target function can obtain a better optimal solution, and the distance between the deployment position and the actual target position is the smallest. In the meantime, the trajectory optimization algorithm of the disclosure expands the ability of trajectory optimization for multiple input variables. Through multiple sets of multiple input variables, the global random update and local random update are performed during each step of the iterative operation. In each step of the iterative operation, the prediction of the minimum error distance and comparison in a set and comparison between different sets are preformed, that is, multiple sets of multiple control variables are updated in parallel, comparison between different sets and within a set are performed to select the optimal result, so as to achieve a fast, efficient and accurate solution of the global optimal trajectory.

2. The underwater three-dimensional trajectory prediction model designed by the disclosure can take into account the asymmetric vortex shedding phenomenon that occurs along with the crossing flow, and calculate the lateral lifting force and lateral displacement of the marine sensor that does not rotate in axial rotation during the gliding process. Accordingly, the underwater three-dimensional trajectory prediction model provided by the disclosure increases the motion information of the lateral dimension, which is more in line with the actual three-dimensional gliding motion without axial rotation, and improves the engineering applicability of the prediction model.

3. The underwater three-dimensional trajectory prediction model designed by the disclosure modifies the calculation method of the lateral lifting force of the marine sensor during the gliding process while in axial rotation, and calculates lifting force generated by the marine sensor in viscous flow during axial rotation, and successfully takes into consideration the influence of the fluid viscosity. Therefore, the underwater three-dimensional trajectory prediction model provided by the present disclosure improves the accuracy of the motion information in the lateral dimension, and is more in line with the actual gliding motion of the marine sensor with axial rotation, which greatly improves the accuracy of the prediction model in engineering application.

4. The trajectory optimization algorithm designed by the disclosure has flexible iteration steps, which can be large or small, is able to be free from the limitation of single step length, and increases the search space per unit time. Through the global random walk algorithm and the local random walk algorithm, the main control parameters are updated twice, so that the main control parameters can be updated more frequently, which increases the efficiency of the optimal solution search.

5. The method for optimizing the underwater trajectory of the marine sensor designed by the disclosure can be applied to the trajectory optimization problems of the marine sensor in a wider range of operating requirements, including short time, high speed, short range, etc., and can be used to provide a more accurate guidance for optimal design and implementation of underwater deployment operation of marine sensors. In the meantime, the underwater trajectory optimization method designed by the disclosure can be used to solve the trajectory optimization problems for a variety of different types of marine sensors such as marine environment detection, underwater seismic monitoring, acoustic detection sensors, etc., and other underwater long-term observation type unpowered devices.

DESCRIPTION OF THE EMBODIMENTS

In order to make the purpose, technical solutions, and advantages of the disclosure clearer, the following further describes the disclosure in detail with reference to the accompanying drawings and embodiments. It should be understood that the specific embodiments described here are only used to explain the disclosure, but not to limit the disclosure. In addition, the technical features involved in the various embodiments of the disclosure described below can be combined with each other as long as they do not conflict with each other.

Figure 1:
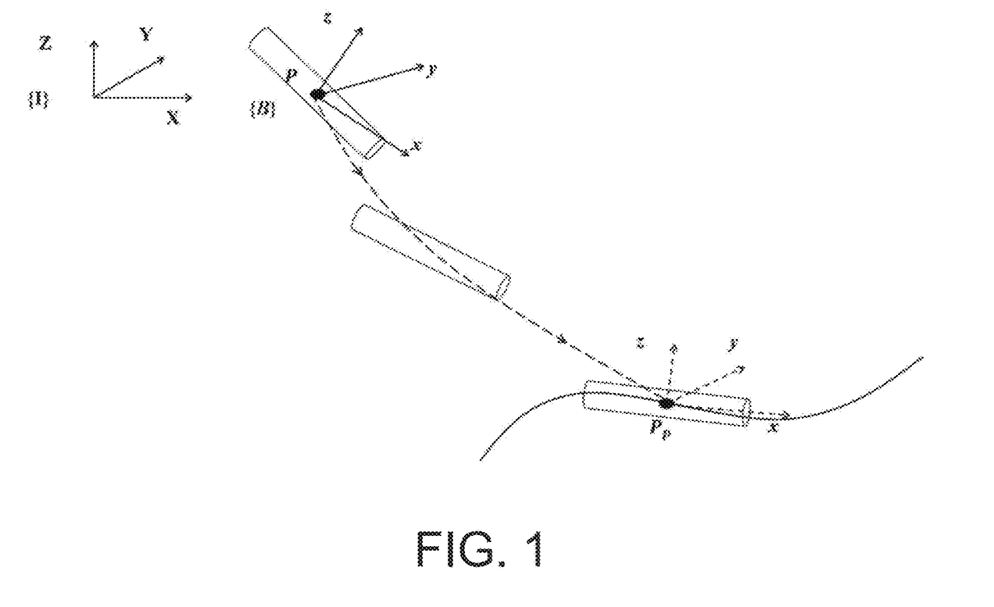
FIG. 1 is the definition diagram of the coordinate system.
Figure 4:
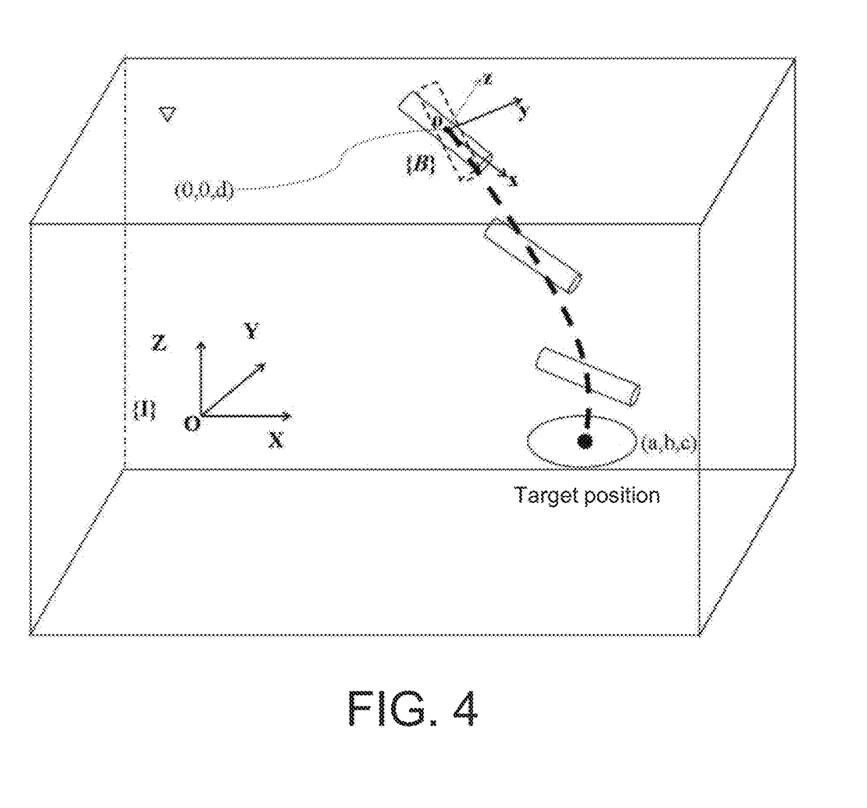
FIG. 4 is a display diagram of the underwater deployment operation of the marine environment detection sensor.

As shown in FIG. 1 and FIG. 4, the marine environment detection sensor is deployed at a certain position underwater and performs a gliding motion until the sensor reaches a certain target position at the bottom of the water. In this embodiment, obtaining the minimum deployment error serves as an example, the underwater gliding motion trajectory of the marine environment detection sensor is optimized through the trajectory optimization method to set the main control variable value before the deployment. It should be noted that the trajectory optimization method is also applicable to the trajectory optimization of other marine sensors such as underwater seismic monitoring sensors, acoustic detection sensors, etc., and other underwater long-term observation type unpowered devices for underwater accurate deployment operations.

First, the underwater glide kinematics model is established first. As shown in FIG. 1, the global coordinate system used as the inertial system is {I}-OXYZ, and the coordinate system is regarded as positive when the Z axis is at the top. In the meantime, the local coordinate system is represented by {B}-oxyz, which is a right-hand Cartesian coordinate system fixed at the gravity center of the marine environment detection sensor.

In order to describe the motion of the sensor (in this embodiment, a slender cylinder) as a free fall in water, the following equations need to be solved in a local coordinate system.

$$\dot{U} = \frac{1}{m}[(G-B)\sin\theta + F_{dx} + F_{ex}] - W\omega_y + V\omega_z + L_G(\omega_y^2 + \omega_z^2)$$

$$\dot{V} = \frac{1}{m}[-(G-B)\cos\theta\sin\phi + F_{dy} + F_{ly} + F_{ey}] - U\omega_z - L_G\dot{\omega}_z$$

$$\dot{W} = \frac{1}{m}[-(G-B)\cos\theta\cos\phi + F_{dz} + F_{lz} + F_{ez}] + U\omega_y + L_G\dot{\omega}_y$$

$$\dot{\omega}_y = \frac{1}{J_y}\left(M_{ly} + M_{dy} + M_{ey} + M_{GBy} + mL_G\dot{W} - mL_GU\omega_y\right)$$

$$\dot{\omega}_z = \frac{1}{J_z}\left(M_{lz} + M_{dz} + M_{ez} - mL_G\dot{V} - mL_GU\omega_z\right)$$

In the formula, $\dot{U}$, $\dot{V}$ and $\dot{W}$ are the acceleration components of the sensor in the x-, y-, z-directions in the local coordinate system; $\dot{\omega}_y$ and $\dot{\omega}_z$ are the angular acceleration components of the sensor in the y-, z-directions in the local coordinate system. m is the mass of the marine environment detection sensor, U, V, and W are the velocity components of the sensor in translation in the x-, y-, z-directions in the local coordinate system. $\omega_x$, $\omega_y$ and $\omega_z$ are the angular velocity of the sensor in the x-, y-, z-directions in the local coordinate system. $\phi$, $\theta$, $\psi$ are the Euler angles of the sensor in the local coordinate system, which represent the axial rotation angle, pitch angle, and yaw angle, respectively. $J_y$ and $J_z$ are the moment of inertia of the sensor with respect to the y-axis and z-axis, respectively. Buoyancy B is the hydrostatic pressure item related to the drainage volume of the marine environment detection sensor. $M_{GBy}$ is the hydrostatic moment caused by the relative offset $L_G$ between the buoyancy center B and the gravity center G. $F_e$ and $M_e$ are the hydrodynamic force and moment of the sensor. $F_l$ and $M_l$ are the lifting force and torque received by the sensor. $F_d$ and $M_d$ are the drag force and torque received by the sensor. The subscripts x, y, z indicate that the corresponding parameter is the component on the corresponding coordinate axis.

It should be noted that if the axial rotation rate along the x-axis is zero, that is, $\omega_x=0$ at the initial moment, the axial rotation rate is always very close to zero during the falling process. Otherwise, suppose $\omega_x=c$, and c is a fixed value throughout the process. In other words, in this embodiment, because the freely falling process is very short, for simplification, the possible deceleration of the axial rotation due to the viscosity of water is ignored.

The relationship between the angular velocity of the marine environment detection sensor and the Euler angle is obtained through the conversion rule of the local coordinate system and the global coordinate system as follows:

$$\begin{bmatrix} \omega_x \\ \omega_y \\ \omega_z \end{bmatrix} = \begin{bmatrix} -\dot{\psi}\sin(\theta) \\ \dot{\psi}\sin(\phi)\cos(\theta) \\ \dot{\psi}\cos(\phi)\cos(\theta) \end{bmatrix} + \begin{bmatrix} 0 \\ \dot{\theta}\cos(\phi) \\ -\dot{\theta}\sin(\phi) \end{bmatrix} + \begin{bmatrix} \dot{\phi} \\ 0 \\ 0 \end{bmatrix}$$

A dynamic model is established for each force in the underwater gliding motion equation, and the kinematics equation and dynamics model are solved at the same time to obtain each transient motion parameter and magnitude of force. The underwater glide kinematics model and dynamics model can be established offline and then directly called online during the trajectory optimization process.

(1) Calculation of Hydrodynamic Force and Moment:

According to the potential flow theory under the slender body hypothesis, the hydrodynamic forces in the y and z directions are calculated as:

$$F_{ey}=-\dot{V}m_{22}-\dot{\omega}_y m_{24}-UVM_{22}(x_t)+U\omega_z x_t M_{22}(x_t)$$

$$F_{ez}=\dot{W}m_{33}-\dot{\omega}_z m_{35}-UWM_{33}(x_t)+U\omega_y x_t M_{33}(x_t)$$

The hydrodynamic torques in the y and z directions are calculated as follows:

$$M_{ey}=\dot{W}m_{35}-\dot{\omega}_y m_{55}-UW[m_{33}+x_t m M_{33}(x_t)]+U\omega_y[m_{35}-(x_t)^2 M_{33}(x_t)]$$

$$M_{ez}=-\dot{V}m_{26}-\dot{\omega}_z m_{66}-UV[m_{22}+x_t M_{22}(x_t)]+U\omega_z[m_{26}-(x_t)^2 M_{22}(x_t)]$$

In the formula, $m_{22}$, $m_{24}$, $m_{26}$, $m_{33}$, $m_{35}$, $m_{55}$ and $m_{66}$ are the three-dimensional additional mass coefficients of the marine sensor, and $M_{22}(x_t)$ and $M_{33}(x_t)$ respectively represent the two-dimensional additional mass coefficients of the effective trailing edge in the y and z directions. $x_t$ is the longitudinal position of the effective trailing edge. For a marine environment detection sensor with a tip, the lateral force is zero: $M_{33}(x_t)=0$ $M_{22}(x_t)=0$. For a marine environment detection sensor with two blunt ends, $M_{33}(x_t)\neq 0$, $M_{22}(x_t)\neq 0$.

(2) Calculation of axial drag force: since the water flow is generated axially, and is characterized in that its contact area with the marine environment detection sensor is large for a long time, and is mainly composed of frictional resistance and shape resistance, the axial drag force $F_{dx}$ is calculated as follows:

$$F_{dx} = \begin{cases} -C_1\pi D\sqrt{v\rho^2 L}\, U\sqrt{|U|} - \frac{1}{8}\rho\pi C_{dt}D^2 U|U|, & \text{"Laminar flow"} \\ -C_2\frac{1}{2}\rho\pi DLU^2 - \frac{1}{8}\rho\pi C_{dt}D^2 U|U|, & \text{"Transition flow"} \\ C_3\frac{1}{2}\rho\pi DLU^2 - \frac{1}{8}\rho\pi C_{dt}D^2 U|U|, & \text{"Turbulence"} \end{cases}$$

In the expression, D is the cross-sectional diameter of the marine environment detection sensor, v is the kinematic coefficient of water, ρ is the mass density of water, $C_{dt}$ is the tangential shape drag coefficient of the sensor, $C_1$, $C_2$, and $C_3$ are the shape drag coefficient of the sensor when there are laminar flow, transition flow and turbulence, L is the length of the sensor.

(3) Lateral drag force: Since water flow is generated in the manner of laterally surrounding the marine environment detection sensor, and is characterized in that, since the sensor has a large aspect ratio, it is estimated by the strip theory. The lateral drag force $F_{dy}$ and $F_{dz}$ are calculated as follows:

$$F_{dy} = \frac{1}{2}\rho C_{dy}D \int_{-0.5L}^{0.5L} -(V+\omega_z x)|V+\omega_z x|dx$$

$$F_{dz} = \frac{1}{2}\rho C_{dz}D \int_{-0.5L}^{0.5L} -(W-\omega_y x)|W-\omega_y x|dx$$

Correspondingly, the resistance moments $M_{dy}$ and $M_{dz}$ that is caused by lateral drag force have the following expressions:

$$M_{dy} = \frac{1}{2}\rho C_{dz}D \int_{-0.5L}^{0.5L} x(W-\omega_y x)|W-\omega_y x|dx$$

$$M_{dz} = -\frac{1}{2}\rho C_{dy}D \int_{-0.5L}^{0.5L} x(V+\omega_z x)|V+\omega_z x|dx$$

In the formula, $C_{dy}$ and $C_{dz}$ are the drag coefficients in the y and z directions, respectively.

(4) If the marine environment detection sensor does not rotate axially, the lifting force and torque are the lateral forces that are generated mainly due to the wake vortex distribution asymmetry that is caused by the water flow that laterally surrounds the marine environment detection sensor. For the lifting force $F_{ly}$ and the lifting force $F_{lz}$ caused by the asymmetry of the wake vortex distribution, the lifting force moments $M_{ly}$, and $M_{lz}$ are calculated as follows:

$$F_{ly} = \frac{1}{2}\rho D \int_{-0.5L}^{0.5L} (W-\omega_y x)C_l(x)dx$$

$$F_{lz} = -\frac{1}{2}\rho D \int_{-0.5L}^{0.5L} (V+\omega_z x)C_l(x)dx$$

$$M_{ly} = \frac{1}{2}\rho D \int_{-0.5L}^{0.5L} x(V+\omega_z x)C_l(x)dx$$

$$M_{lz} = \frac{1}{2}\rho D \int_{-0.5L}^{0.5L} x(W-\omega_y x)C_l(x)dx$$

In the formula, the lifting force coefficient $C_l(x)$ is calculated as follows:

$$C_l(x) = \begin{cases} KC_{La}\sin[\pi St(t'-8)], & t' > 8 \\ 0, & t' \le 8 \end{cases}$$

Figure 2:
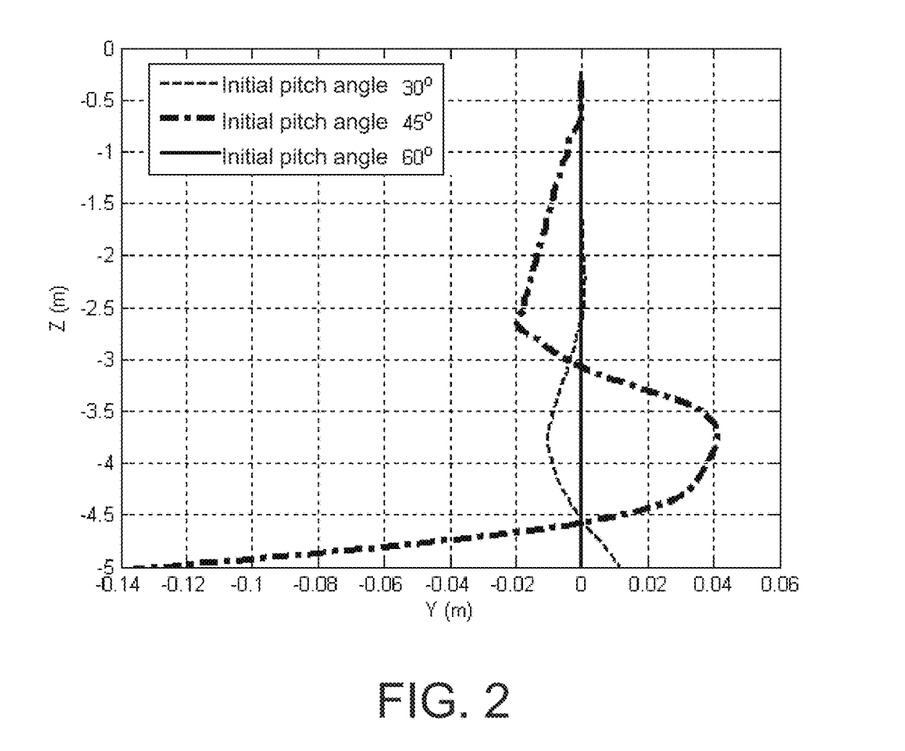
FIG. 2 is a motion information diagram of the marine environment detection sensor at lateral dimension when not in axial rotation during the gliding process.

In the expression, $St=f_v D/V_a$ is the Strouhal number, $f_v$ is the vortex shedding frequency, $V_a$ is the cross-flow velocity. It should be noted that K=±1 reflects the random behavior of the lifting direction during gliding. In the deployment that is performed at different initial pitch angles as shown in FIG. 2, the lateral movement trajectories of the marine environment detection sensor are shown in the form of vibrations. $C_{La}$ is the lift constant, and the time coefficient t' calculated is as follows.

$$t' = \frac{s(x)}{R} - 0.351$$

In the formula, s(x) is the displacement in the y direction when water flows around the cross section of the sensor, and R is the radius of the cross section of the sensor.

Figure 3:
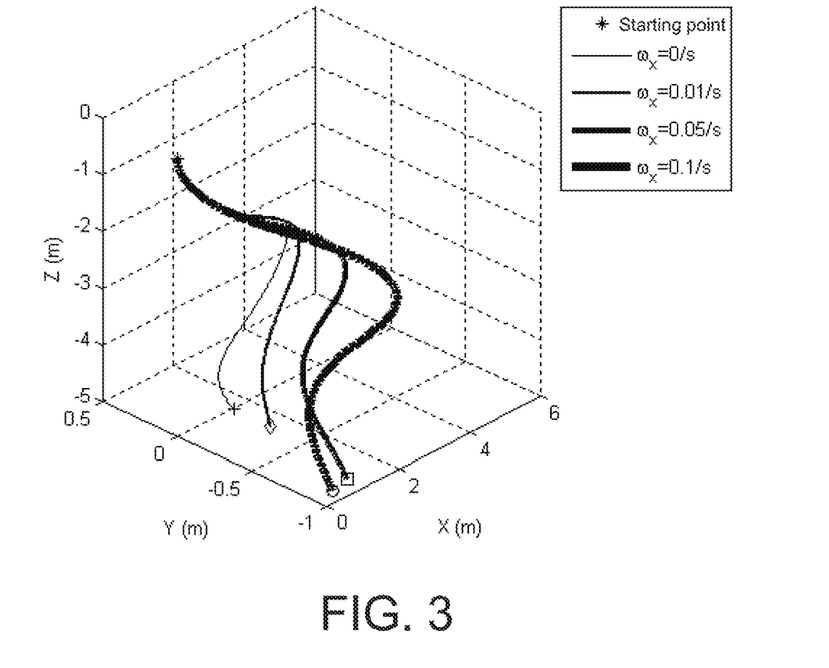
FIG. 3 is a motion information diagram of the marine environment detection sensor at lateral dimension when in axial rotation during the gliding process.

(5) If the marine environment detection sensor rotates axially, the pressure difference between the two sides of the marine environment detection sensor is generated when the water flows laterally, which forms lifting forces $F_{ly}$ and $F_{lz}$, and lift moments are $M_{ly}$ and $M_{lz}$. FIG. 3 shows the changes in the three-dimensional motion trajectory of the marine environment detection sensor under different axial rotation rates.

$$F_{ly} = \frac{1}{2}\rho DW \int_{-0.5L}^{0.5L} C'_l(x)(W-\omega_y x)dx$$

$$F_{lz} = -\frac{1}{2}\rho DV \int_{-0.5L}^{0.5L} C'_l(x)(V+\omega_z x)dx$$

$$M_{ly} = \frac{1}{2}\rho DV \int_{-0.5L}^{0.5L} C'_l(x)(V+\omega_z x)x dx$$

$$M_{lz} = \frac{1}{2}\rho DC'_l(x)W \int_{-0.5L}^{0.5L} (W-\omega_y x)x dx$$

In the formula, the lifting force coefficient $C'_l(x)$ is calculated as follows:

$$C'_l(x) = \begin{cases} \dfrac{\omega_x D}{V_a}, & \dfrac{\omega_x D}{V_a} \le 8 \\ 8 + 0.12\left(\dfrac{\omega_x D}{v_a}-8\right), & \dfrac{\omega_x D}{V_a} > 8 \end{cases}$$

Figure 5:
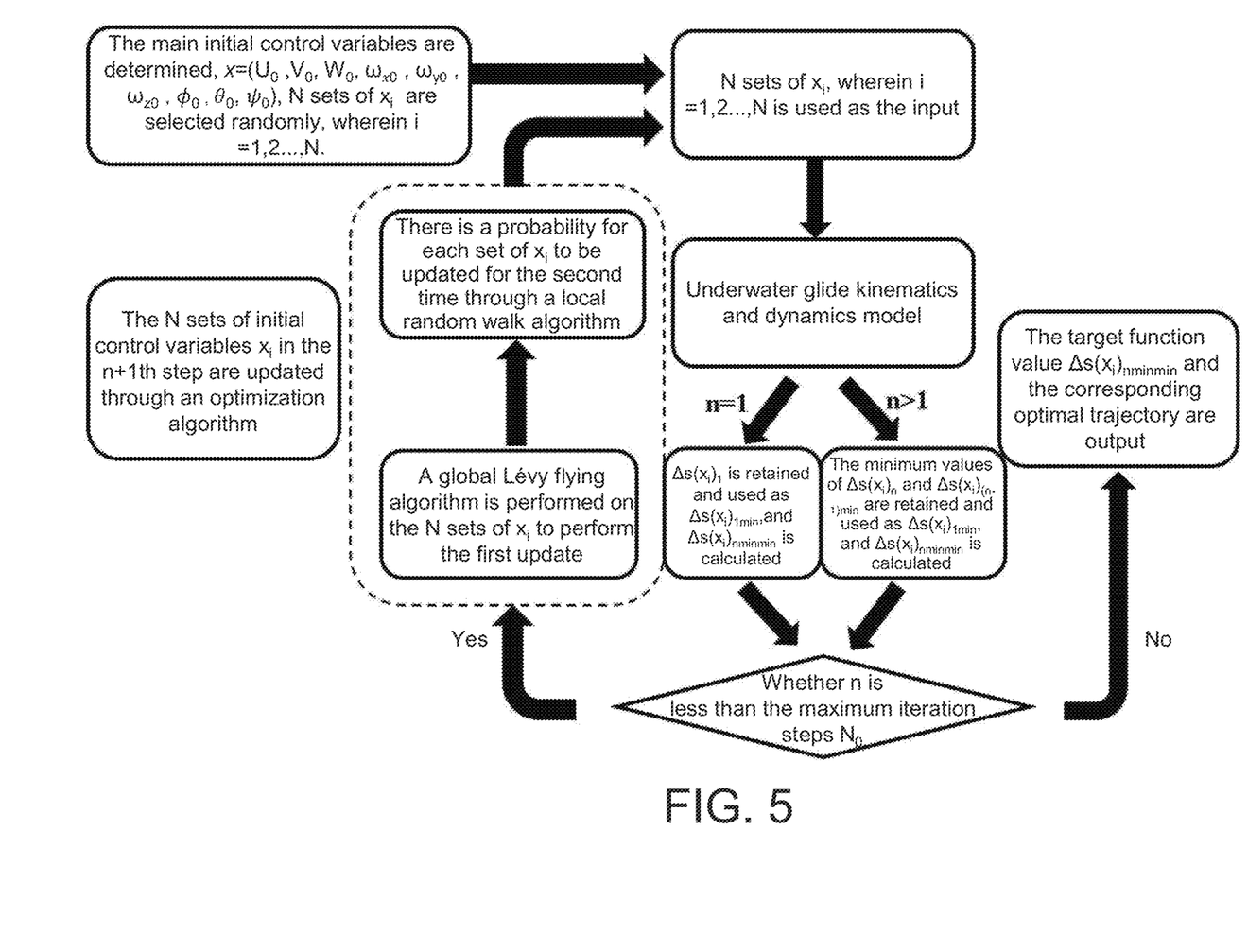
FIG. 5 is a flow chart of the underwater trajectory optimization of the marine environment detection sensor.

FIG. 5 shows the process of optimizing the underwater trajectory of the marine environment detection sensor. First, based on the target function value output by the trajectory prediction model under the N sets of main initial control variables, combined with the global and local random walking algorithms, the main initial control variables are updated, and iterative operation is performed in sequence until the number of updates reaches the preset maximum number of steps. The specific steps are as follows:

Step 1: The main initial control variables and initialization are determined. The initial control variables of the underwater three-dimensional trajectory of the marine environment detection sensor include 9 initial kinematics parameters $x=(U_0, V_0, W_0, \omega_{x0}, \omega_{y0}, \omega_{z0}, \phi_0, \theta_0, \psi_0)$ and the initial position parameters (0, 0, d) of the marine environment detection sensor. $U_0$, $V_0$, $W_0$ are the components of the initial linear velocity in the three coordinate axis directions in the local coordinate system, $\omega_{x0}$, $\omega_{y0}$, $\omega_{z0}$ are the components of the initial angular velocity in the three coordinate axis directions in the local coordinate system, $\phi_0$, $\theta_0$, $\psi_0$ are the initial Euler angles, and d is the initial immersion depth.

In this embodiment, since the slender body is axisymmetric, the change of the initial roll angle will not affect the movement of the slender body, so the initial roll angle and the initial immersion depth are as follows:

$$\phi_0 = 0$$

$$d = -L/2 \sin(\theta_0)$$

To sum up, in the scenario specified in this embodiment, first it is determined that the final eight main initial control variables of the marine environment detection sensor include:

$$x = (U_0, V_0, W_0, \omega_{x0}, \omega_{y0}, \omega_{z0}, \theta_0, \psi_0).$$

Then, for specific task requirements, the initial control variables should satisfy a certain search range, as shown in the following formula:

$$x_{min} \leq x \leq x_{max}$$

N sets of $x_i$ are selected randomly within the above range, wherein i=1, 2 ..., N, then the initialization is completed in the first step.

Step 2: All of N sets of $x_i$ are input into the underwater glide kinematics model and dynamics model of the sensor, and N actual deployment positions are calculated. Then the minimum distance between the target deployment position and the actual deployment position within each set are calculated, and the minimum distances in the N sets are compared with each other, and the minimum value is denoted as:

$$\Delta s(x)_{nminmin} = \text{Min}\{\Delta s(x_1)_{nmin}, \Delta s(x_2)_{nmin}, \ldots \Delta s(x_N)_{nmin}\}$$

In the formula, the subscript n represents the current iteration operation steps, $\Delta s(x_i)_n$ represents the error distance between the actual deployment position and the target deployment position in the n-th step of iterative operation in the i-th set. The subscript min is the mark for minimum value in the set, and the subscript minmin is the mark for minimum value between the sets. $\Delta s(x_i)_{nmin}$ represents the internal minimum deployment error in the n-th step of iterative operation in the i-th set, and $\Delta s(x)_{nminmin}$ represents the global minimum deployment error in the n-th step of iterative operation.

When n=1, $\Delta s(x_i)_1$ is directly used as $\Delta s(x_i)_{1min}$, $\Delta s(x_i)_{1minmin}$ is solved, and then go to step 3;

When n>1, $\Delta s(x_i)_{nmin} = \text{Min}\{\Delta s(x_i)_n, \Delta s(x_i)_{(n-1)min}\}$ is taken, then go to step 3.

Step 2: The target function of the smallest deployment errors are obtained and compared. The global minimum deployment error is the minimum distance between the actual deployment position and the target deployment position, as shown in the following formula:

$$\Delta s(x)_{nminmin} = \text{Min}\{\Delta s(x_1)_{nmin}, \Delta s(x_1)_{nmin}, \Delta s(x_2)_{nmin}, \ldots \Delta s(x_N)_{nmin}\}$$

The N sets of $x_i$ are input into the underwater gliding motion and dynamics model to get the deployment error $\Delta s(x_i)_n$ calculated in the n-th step. For step n=1, the initialized N sets of $x_i$ are input into the underwater gliding motion and dynamics model to obtain the deployment error $\Delta s(x_i)_1$ calculated in step 1, and the obtained $\Delta s(x_i)_1$ is retained and used as the initial deployment error $\Delta s(x_i)_{1min}$ in the i-th set, N sets of $\Delta s(x_i)_{1min}$ are compared, and the minimum value $\Delta s(x)_{nminmin}$ is taken as the initial deployment error.

For step n>1, by comparing the $\Delta s(x_i)_n$ calculated in the n-step and the corresponding $\Delta s(x_i)_{(n-1)min}$ in the n−1-th step, the minimum value is selected as the internal minimum deployment error $\Delta s(x_i)_{nmin}$ in the i-th set in the n-step. N sets of $\Delta s(x_i)_{nmin}$ are compared, and the minimum value $\Delta s(x)_{nminmin}$ is taken as the global minimum deployment error in the n-th step, which is denoted as:

$$\Delta s(x)_{nminmin} = \text{Min}\{\Delta s(x_1)_{nmin}, \Delta s(x_2)_{nmin}, \ldots \Delta s(x_N)_{nmin}\}$$

Specifically, $$\Delta s(x_i)_{nmin} = \text{Min}\{\Delta s(x_i)_n, \Delta s(x_i)_{(n-1)min}\}$$

$$\Delta s(x_i)_n = \sqrt{(X_t(x_i)_n - a)^2 + (Y_t(x_i)_n - b)^2 + (Z_t(x_i)_n - c)^2}$$

(a,b,c) is the target deployment position, $(X_t(x_i)_n, Y_t(x_i)_n, Z_t(x_i)_n)$ is the actual deployment position at the n-th step of iterative operation in the i-th set.

Step 3: It is determined whether n is less than the preset maximum number of iteration steps $N_0$. If $n < N_0$, the N sets of initial control variables x in the n+1th step need to be updated through an optimization algorithm. The specific algorithm is as follows:

(3.1) Global random walk algorithm. A global random walk is performed through Lévy flight, and the first update is performed for the N sets of control parameters $x_i$, as shown in the following formula:

$$x_i^{n+1} = x_i^n + \alpha \otimes \text{Lévy}(s, \lambda),$$

In the formula, $\alpha = a_0(x_j^n - x_i^n)$, and $a_0$ is a constant. In most cases, $\alpha = O(1)$ can be adopted, that is, the order of a is usually 1. $\otimes$ stands for item-based multiplication, and $\lambda$ is the exponent of the Lévy distribution. The advantage of using the Lévy flight to perform a global random walk in this embodiment is that its step length is flexible, which can be large or small, free from the limitation of a single step length, and increases the search space per unit time. In other embodiments, other common global update algorithms can also be used instead.

(3.2) Local random walk algorithm. After the first update (i.e., global update), there is a probability of $p_a \in (0, 1)$ for each set of control parameters $x_i$ in the N sets to be updated for the second time, mainly through a local random walk, as shown in the following formula:

$$x_i^{n+1} = x_i^{n+1} + \epsilon \cdot (x_p^{n+1} - x_q^{n+1}), p, q = 1, 2, \ldots N$$

wherein p and q are two random solutions, and $\epsilon$ conforms to an uniform distribution in the interval [0,1].

After completing the global update and partial update, return to step 2 and the iterative operation is performed in sequence until the number of updates n reaches the preset maximum number of times $N_0$, that is, $n \geq N_0$, and then go to step 4.

Figure 6:
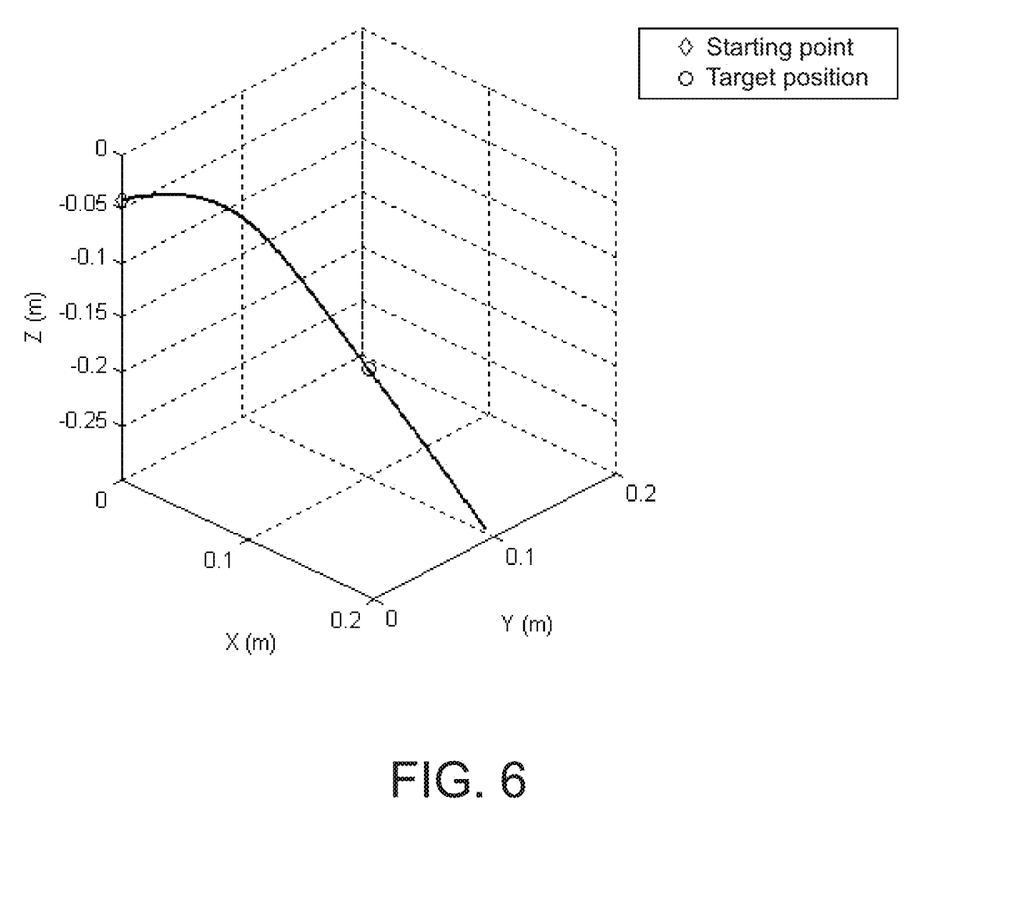
FIG. 6 is the motion trajectory diagram of the marine environment detection sensor after optimization under the target function of the minimum deployment error.

Step 4: The control variable $x_i$ corresponding to $\Delta s(x_i)_{nmin}$, the internal minimum deployment error value $\Delta s(x_i)_{nmin}$ and the corresponding trajectory are output. FIG. 6 shows the optimized trajectory of the target function for the minimum deployment error in this embodiment.

(6) A computer-readable/writable storage medium which stores a computer program. When the computer program is executed, the computer program performs the following steps:

Step 1: randomly generate values for N sets of initial control variables such as velocity, accelerations and orientations within a certain search range. Input all of N sets of xi to the sensor's underwater glide kinematics and dynamics models, and calculate the smallest distance between N actual deployment positions and target deployment positions. 3. The disclosure can improve the accuracy of prediction on the underwater three-dimensional trajectory of the marine sensor.

Step 2: input the selected N sets of initial control variables into the sensor's underwater glide kinematics model.

Step 3: calculate the smallest distance between N actual deployment positions and target deployment positions.

Step 4: determine whether the number of iterative operations is larger than the pre-set value, if yes, output the trajectory and the corresponding control variable as the optimal trajectory and optimal control variable. Otherwise, perform global random walk and local random walk on N sets of control variable, obtain N sets of control variable again, and return to step 2.

Step 5: save the optimal trajectory and optimal control variable such as initial velocity, acceleration and orientation output in step 4 into the computer-readable/writable storage medium.

(7) A trajectory optimization device for accurately deploying a marine sensor under water is provided, which includes the computer-readable/writable storage medium and a processor as described above, and the computer-readable/writable storage medium is able to store the computer program and the data output by the execution of the computer program, the processor is used for calling and processing computer programs stored in the computer-readable storage medium. Once the computer program is called, it starts to solve the sensor's underwater glide kinematics model, output the underwater trajectory of the sensor and the deployment distance error. Finally, the optimal trajectory and optimal control variable such as initial velocity, acceleration and orientation can be obtained by sequential global and local random updates for control variable such as the initial velocity, acceleration and orientation.

In summary, the trajectory optimization method for accurate underwater deployment of marine environment detection sensors provided by the disclosure consists of a set of underwater three-dimensional trajectory prediction models and trajectory optimization algorithms. The underwater three-dimensional trajectory prediction model includes the underwater glide kinematics model and dynamics model of the marine environment detection sensor. The underwater glide kinematics model mainly includes the underwater gliding motion equation of the marine environment detection sensor and the conversion relationship between the local coordinate system and the linear velocity and angular velocity of the global coordinate system obtained through Euler angles. The dynamics model refers to the analysis and description of the force on the marine environment detection sensor when performing gliding motion under water. The trajectory optimization algorithm refers to the use of modern optimization algorithms to find the optimal input conditions and optimal trajectories that meet the underwater deployment operations. The input of the trajectory optimization algorithm is the main initial control variables of the three-dimensional trajectory prediction model, including the initial linear velocity, angular velocity and Euler angle at the moment when the marine environment detection sensor is released. The output of the algorithm is the trajectory of underwater gliding motion of the marine environment detection sensor, the deployment position error and so on.

The underwater three-dimensional trajectory prediction model of the marine environment detection sensor and a trajectory optimization device provided by the disclosure can accurately describe and predict the underwater gliding motion of the marine environment detection sensor with six degrees of freedom. By taking into consideration the lateral force and displacement generated by the axial rotation or the asymmetric vortex, the accuracy of prediction on the underwater gliding trajectory of the marine environment detection sensor can be improved significantly. The trajectory optimization algorithm provided by the disclosure has flexible iteration steps, which can be large or small, free from the limitation of a single step length, so that the optimal solution search is efficient, and the trajectory can be optimized through multiple input variables.

In addition, the method for optimizing the underwater trajectory of a marine environment detection sensor and a trajectory optimization device provided by the disclosure can be applied to trajectory optimization under the condition of a wider range of deployment operations, including high speed, short range, etc., and can be used to provide a more accurate guidance for optimal design and implementation of underwater deploying operation of marine environment detection sensors. In the meantime, the underwater trajectory optimization method can be used for performing accurate deployment and arrangement for other underwater long-term observation type unpowered devices such as underwater seismic monitoring, acoustic detection sensors, and so on.

Those skilled in the art can easily understand that the above are only preferred embodiments of the disclosure and are not intended to limit the disclosure. Any modification, equivalent replacement and improvement, etc., made within the spirit and principle of the disclosure should be included in the protection scope of the disclosure.

What is claimed is:

1. A trajectory optimization method for accurately deploying marine sensors under water, comprising the following steps:

step 1: according to a preset search range $x_{min} \leq x \leq x_{max}$, N sets of values are randomly selected for initial control variables $x=(U_0, V_0, W_0, \omega_{x0}, \omega_{y0}, \omega_{z0}, \phi_0, \theta_0, \psi_0)$, denoted as $x_i$, wherein, i=1, 2 . . . , N, representing an i-th set, $x_{min}$, $x_{max}$ are a lower limit and an upper limit of the search range, $U_0$, $V_0$ and $W_0$ are components of an initial linear velocity in x-, y-, z-directions in an local coordinate system, $\omega x_0$, $\omega_{y0}$ and $\omega_{z0}$ are components of an initial angular velocity $\omega_0$ in the x-, y-, z-directions in the local coordinate system, and $(\phi_0, \theta_0, \psi_0)$ are initial Euler angles of the sensor;

step 2: in an n-th iterative operation, all N sets of $x_i$ are input into an underwater glide kinematics and dynamics model for an underwater trajectory of the sensor, and N actual deployment positions are calculated, then, a minimum deployment error $\Delta s(x_i)_{nmin}$ between a target deployment position and the actual deployment position of each set of $x_i$ in the current iterative operation is calculated, thereafter, minimum distances corresponding to the N sets of $x_i$ are compared with each other, a minimum value is taken as a global minimum deployment error $\Delta s(x)_{nminmin}$ of this iterative operation, wherein:

when n=1, $\Delta s(x_i)_{lmin}=\Delta s(x_i)_1$, $\Delta s(x)_{1minmin}$ is denoted as follows, and turn to step 3:

$\Delta s(x)_{1minmin}=\text{Min}\{\Delta s(x_1)_1, \Delta s(x_2)_1, \ldots \Delta s(x_N)_1\}$;

when n>1, $\Delta s(x_i)_{nmin}=\text{Min}\{\Delta s(x_i)_n, \Delta s(x_i)_{(n-1)min}\}$, and then turn to step 3, under the circumstances, $\Delta s(x)_{nminmin}=\text{Min}\{\Delta s(x_1)_{nmin}, \Delta s(x_2)_{nmin}, \ldots \Delta s(x_N)_{nmin}\}$ wherein a subscript n represents current iteration operation steps, $\Delta s(x_i)_n$ represents an error distance between the actual deployment position and the target deployment position in the n-th step of iterative operation in the i-th set, a subscript min is a mark for a minimum value in the set, and a subscript minmin is a mark for minimum value between the sets, $\Delta s(x_i)_{nmin}$ represents the internal minimum deployment error in the n-th step of iterative operation in the i-th set, and $\Delta s(x)_{nminmin}$ represents a global minimum deployment error of a whole domain in the n-th step of iterative operation;

step 3: determine whether n is less than a preset maximum number of iteration steps $N_0$, if yes, a global random walk is performed, N sets of $x_i$ are updated, and then a local random walk is performed on the above updated N sets of $x_i$ according to a preset probability, the N sets of x are obtained again, and return to step 2; otherwise, go to step 4;

step 4: the control variable $x_i$ corresponding to $\Delta s(x)_{nminmin}$ and a corresponding trajectory are output as an optimal control variable and an optimal trajectory, wherein the optimal control variable and the optimal trajectory are used to improve an accuracy of a three-dimensional underwater trajectory prediction for the marine sensor to be deployed underwater.

2. The trajectory optimization method for accurately deploying marine sensors underwater according to claim 1, wherein, in step 2, the underwater glide kinematics and dynamics model for the underwater trajectory of the sensor is as follows:

$$\dot{U} = \frac{1}{m}[(G-B)\sin\theta + F_{dx} + F_{ex}] - W\omega_y + V\omega_Z + L_G(\omega_y^2 + \omega_z^2)$$

$$\dot{V} = \frac{1}{m}[-(G-B)\cos\theta\sin\phi + F_{dy} + F_{ly} + F_{ey}] - U\omega_z - L_G\dot{\omega}_z$$

$$\dot{W} = \frac{1}{m}[-(G-B)\cos\theta\cos\phi + F_{dz} + F_{lz} + F_{ez}] + U\omega_y + L_G\dot{\omega}_y$$

$$\dot{\omega}_y = \frac{1}{J_y}\left(M_{ly} + M_{dy} + M_{ey} + M_{GBy} + mL_G\dot{W} - mL_GU\omega_y\right)$$

$$\dot{\omega}_z = \frac{1}{J_z}\left(M_{lz} + M_{dz} + M_{ez} - mL_G\dot{V} - mL_GU\omega_z\right)$$

in the formula, $\dot{U}$, $\dot{V}$ and $\dot{W}$ are acceleration components of the sensor in the x-, y-, z-directions in the local coordinate system; $\dot{\omega}_y$ and $\dot{\omega}_z$ are angular acceleration components of the sensor in the y-, z-directions in the local coordinate system;

m is a mass of the sensor, U, V, and W are velocity components of the sensor in the x-, y-, z-directions in the local coordinate system, $\omega_x$, $\omega_y$ and $\omega_z$ are angular velocities of the sensor in the x-, y-, z-directions in the local coordinate system, $\phi$, $\theta$, and $\psi$ are roll, pitch and yaw angles of the sensor in the local coordinate system, $J_y$ and $J_z$ are moment of inertia of the sensor with respect to the y-axis and z-axis, respectively, B is a buoyancy force of the sensor, $M_{GBy}$ is a hydrostatic moment caused by a relative offset $L_G$ between the buoyancy center B and a gravity center G, $F_e$ and $M_e$ are a hydrodynamic force and a moment of the sensor, $F_l$ and $M_l$ are a lifting force and a torque received by the sensor, $F_d$ and $M_d$ are a drag force and a torque received by the sensor, the subscripts x, y, z indicate that the corresponding parameter is a component on the corresponding coordinate axis;

a relationship between the angular velocity and the Euler angles is obtained through a conversion rule for a local coordinate system and a global coordinate system:

$$\begin{bmatrix} \omega_x \\ \omega_y \\ \omega_z \end{bmatrix} = \begin{bmatrix} -\dot{\psi}\sin(\theta) \\ \dot{\psi}\sin(\phi)\cos(\theta) \\ \dot{\psi}\cos(\phi)\cos(\theta) \end{bmatrix} + \begin{bmatrix} 0 \\ \dot{\theta}\cos(\phi) \\ -\dot{\theta}\sin(\phi) \end{bmatrix} + \begin{bmatrix} \dot{\phi} \\ 0 \\ 0 \end{bmatrix}$$

wherein $\dot{\psi}$, $\dot{\theta}$, $\dot{\phi}$ are change rates of a yaw angle $\psi$, a pitch angle $\theta$ and a roll angle $\phi$ that varies with time.

3. The trajectory optimization method for accurately deploying marine sensors underwater according to claim 2, wherein the hydrodynamic forces in the y and z directions are calculated by the following expressions:

$$F_{ey} = \dot{V}m_{22} - \dot{\omega}_z m_{24} - UVM_{22}(x_t) + U\omega_z x_t M_{22}(x_t)$$

$$F_{ez} = \dot{W}m_{33} - \dot{\omega}_z m_{35} - UVM_{33}(x_t) + U\omega_y x_t M_{33}(x_t)$$

hydrodynamic torques in the y and z directions are calculated according to the following formula:

$$M_{ey} = -\dot{W}m_{35} - \dot{\omega}_y m_{55} - UW[m_{33} + x_t mM_{33}(x_t)] + U\omega_y [m_{35} - (x_t)^2 M_{33}(x_t)]$$

$$M_{ez} = -\dot{V}m_{26} - \dot{\omega}_z m_{66} - UV[m_{22} + x_t M_{22}(x_t)] + U\omega_z [m_{26} - (x_t)^2 M_{22}(x_t)]$$

in the formula, $m_{22}$, $m_{24}$, $m_{26}$, $m_{33}$, $m_{35}$, $m_{55}$ and $m_{66}$ are three-dimensional additional mass coefficients of the sensor, and $M_{22}(x_t)$ and $M_{33}(x_t)$ respectively represent two-dimensional additional mass coefficients of an effective trailing edge in the y and z directions, $x_t$ is a longitudinal position of an effective trailing edge; for a sensor with a tip, $M_{33}(x_t)=0$, $M_{22}(x_t)=0$, for a marine sensor with two blunt ends, $M_{33}(x_t)\neq 0$, $M_{22}(x_t)\neq 0$.

4. The trajectory optimization method for accurately deploying marine sensors underwater according to claim 2, wherein the drag force and the torque are generated by a relative translational movement of the sensor in contact with water, and an axial drag force $F_{dx}$ is calculated as follows:

$$F_{dx} = \begin{cases} -C_1\pi D\sqrt{v\rho^2 L}\, U\sqrt{|U|} - \frac{1}{8}\rho\pi C_{dt}D^2 U|U|, & \text{"Laminar flow"} \\ -C_2\frac{1}{2}\rho\pi DLU^2 - \frac{1}{8}\rho\pi C_{dt}D^2 U|U|, & \text{"Transition flow"} \\ C_3\frac{1}{2}\rho\pi DLU^2 - \frac{1}{8}\rho\pi C_{dt}D^2 U|U|, & \text{"Turbulence"} \end{cases}$$

wherein D is a cross-sectional diameter of the sensor, v is a kinematic viscosity of the water, $\rho$ is a density of the water, $C_{dt}$ is a tangential shape drag coefficient of the sensor, $C_1$, $C_2$, and $C_3$ are shape drag coefficients of the sensor when there are laminar flow, transition flow and turbulence, L is a length of the sensor;

lateral drag forces $F_{dy}$ and $F_{dz}$ in the y and z directions are as calculated follows:

$$F_{dy} = \frac{1}{2}\rho C_{dy}D\int_{-0.5L}^{0.5L} -(V+\omega_z x)|V+\omega_z x|dx$$

$$F_{dz} = \frac{1}{2}\rho C_{dz}D\int_{-0.5L}^{0.5L} -(W-\omega_y x)|W-\omega_y x|dx$$

resistance moments $M_{dy}$ and $M_{dz}$ caused by the lateral drag force are calculated as follows:

$$M_{dy} = \frac{1}{2}\rho C_{dz} D \int_{-0.5L}^{0.5L} x(W - \omega_y x)|W - \omega_y x|dx$$

$$M_{dz} = -\frac{1}{2}\rho C_{dy} D \int_{-0.5L}^{0.5L} x(V + \omega_z x)|V + \omega_z x|dx$$

wherein $C_{dy}$ and $C_{dz}$ are respectively the drag coefficients in the y and z directions.

5. The trajectory optimization method for accurately deploying marine sensors underwater according to claim 2, wherein if the marine sensor itself does not rotate around the axis, the lifting force $F_l$ and the moment $M_l$ are the lateral forces that are mainly caused by the asymmetry of a wake vortex distribution during the flow of water laterally crossing the sensor; if the sensor itself rotates, the water flow circulates laterally and generates pressure difference between two sides of the sensor, which forms the lifting force;

the lifting force that is generated when the sensor does not rotate in the axial direction is caused by the asymmetry of the wake vortex distribution, and the lifting forces are calculated as follows:

$$F_{ly} = \frac{1}{2}\rho D \int_{-0.5L}^{0.5L}(W - \omega_y x)C_l(x)dx$$

$$F_{lz} = -\frac{1}{2}\rho D \int_{-0.5L}^{0.5L}(V + \omega_z x)C_l(x)dx$$

$$M_{ly} = \frac{1}{2}\rho D \int_{-0.5L}^{0.5L} x(V + \omega_z x)C_l(x)dx$$

$$M_{lz} = \frac{1}{2}\rho D \int_{-0.5L}^{0.5L} x(W - \omega_y x)C_l(x)dx$$

wherein the lifting force coefficient $C_l(x)$ is calculated as follows:

$$C_l(x) = \begin{cases} KC_{La}\sin[\pi St(t' - 8)], & t' > 8 \\ 0, & t' \leq 8 \end{cases},$$

wherein $St = f_v D/V_a$ is the Strouhal number, $f_v$ is a vortex shedding frequency, $V_a$ is a cross-flow velocity, $K=\pm 1$ reflects a random behavior of the lifting direction during gliding, $C_{La}$ is a lift constant, and the time coefficient t' is calculated as follows:

$$t' = \frac{s(x)}{R} - 0.351$$

wherein s(x) is a displacement in the y direction when the water flows around a cross section of the sensor, and R is a radius of the cross section of the sensor;

the lifting force and moment during axial rotation are calculated as follows:

$$F_{ly} = \frac{1}{2}\rho DW \int_{-0.5L}^{0.5L} C'_l(x)(W - \omega_y x)dx$$

$$F_{lz} = -\frac{1}{2}\rho DV \int_{-0.5L}^{0.5L} C'_l(x)(V + \omega_z x)dx$$

$$M_{ly} = \frac{1}{2}\rho DV \int_{-0.5L}^{0.5L} C'_l(x)(V + \omega_z x)xdx$$

$$M_{lz} = \frac{1}{2}\rho DC'_l(x)W \int_{-0.5L}^{0.5L}(W - \omega_y x)xdx$$

wherein the lifting force coefficient $C'_l(x)$ is calculated as follows:

$$C'_l(x) = \begin{cases} \frac{\omega_x D}{V_a}, & \frac{\omega_x D}{V_a} \leq 8 \\ 8 + 0.12\left(\frac{\omega_x D}{v_a} - 8\right), & \frac{\omega_x D}{V_a} > 8 \end{cases}.$$

6. The trajectory optimization method for accurately deploying marine sensors underwater according to claim 1, wherein the sensor in the local body coordinate system is an axisymmetric slender body, and the change of an initial roll angle does not affect the movement of the slender body, therefore, the initial roll angle and an initial immersion depth are as follows:

$$\phi_0 = 0$$

$$d = -L/2 \sin(\theta_0)$$

thus, the initial control variable is simplified as $x=(U_0, V_0, W_0, \omega x_0, \omega_{y0}, \omega_{z0}, \theta_0, \psi_0)$, and L represents the length of the sensor.

7. The trajectory optimization method for accurately deploying marine sensors underwater according to claim 1, wherein in step 3, a global random walk is performed through Lévy flight, and global update is performed for N sets of control parameters $x_i$, as shown in the following formula:

$$x_i^{n+1} = x_i^n + \alpha \otimes \text{Lévy}(s, \lambda)$$

in the formula, $\alpha = \alpha_0(x_j^t - x_i^t)$, $\alpha_0$ is a preset constant, $x_j$ represents the j-th set of control parameters x that is randomly generated, s represents the step length of the iterative operation, $\otimes$ stands for item-based multiplication, and $\lambda$ is an exponent of a Lévy distribution.

8. The trajectory optimization method for accurately deploying marine sensors underwater according to claim 1, wherein after the global update in step 3, each set of control parameters $x_i$ has a probability of $p_a \in (0,1)$ to be locally update, and the update method of the local random walk is shown in the following formula:

$$x_i^{n+1} = = x_i^{n+1} + \epsilon \cdot (x_p^{n+1} - x_q^{n+1}), p,q=1,2,\ldots N$$

wherein $x_p$ and $x_q$ are two random solutions, $\epsilon$ conforms to an uniform distribution of an interval [0,1], and the superscript n+1 is the number of iterations in the next step.

9. A computer-readable/writable storage medium storing a computer program, wherein when the computer program is executed, the computer program performs the following steps:

step 1: randomly generating values for N sets of initial control variables such as velocity, accelerations and orientations within a certain search range; inputting all of N sets of xi to an underwater glide kinematics and dynamics model for an underwater trajectory of the sensor, and calculating a smallest distance between N actual deployment positions and target deployment positions;

step 2: inputting the selected N sets of initial control variables into the underwater glide kinematics and dynamics model for the underwater trajectory of the sensor;

step 3: calculating the smallest distance between N actual deployment positions and target deployment positions;

step 4: determining whether a number of iterative operations is larger than a pre-set value, if yes, outputting the trajectory and the corresponding control variable as an optimal trajectory and an optimal control variable, otherwise, performing global random walk and local random walk on the N sets of control variable, obtaining N sets of control variable again, and returning to step 2;

step 5: save the optimal trajectory and the optimal control variable such as initial velocity, acceleration and orientation output in step 4 into the computer-readable/writable storage medium, wherein the optimal control variable and the optimal trajectory are used to improve an accuracy of a three-dimensional underwater trajectory prediction for the marine sensor to be deployed underwater.

10. A trajectory optimization device for accurately deploying a marine sensor under water, comprising:

a computer-readable/writable storage medium of claim 9 and a processor, wherein the computer-readable/writable storage medium is able to store the computer program and the data output by an execution of the computer program, the processor is used for calling and processing computer programs stored in the computer-readable storage medium, once the computer program is called, it starts to solve the underwater glide kinematics and dynamics model for the underwater trajectory of the sensor, output the underwater trajectory of the sensor and the deployment distance error, finally, the optimal trajectory and optimal control variable such as initial velocity, acceleration and orientation can be obtained by sequential global and local random updates for control variable such as the initial velocity, acceleration and orientation.

11. The trajectory optimization method for accurately deploying marine sensors underwater according to claim 2, wherein the sensor in the local body coordinate system is an axisymmetric slender body, and the change of an initial roll angle does not affect the movement of the slender body, therefore, the initial roll angle and an initial immersion depth are as follows:

$$\phi_0=0$$

$$d=-L/2\sin(\theta_0)$$

thus, the initial control variable is simplified as $x=(U_0, V_0, W_0, \omega_{x0}, \omega_{y0}, \omega_{z0}, \theta_0, \psi_0)$, and L represents the length of the sensor.

12. The trajectory optimization method for accurately deploying marine sensors underwater according to claim 2, wherein in step 3, a global random walk is performed through Lévy flight, and global update is performed for N sets of control parameters $x_i$, as shown in the following formula:

$$x_i^{n+1}=x_i^n+\alpha\otimes\text{Lévy}(s,\lambda)$$

in the formula, $\alpha=\alpha_0(x_j^t-x_i^t)$, $\alpha_0$ is a preset constant, $x_j$ represents the j-th set of control parameters x that is randomly generated, s represents the step length of the iterative operation, $\otimes$ stands for item-based multiplication, and $\lambda$ is an exponent of a Levy distribution.

13. The trajectory optimization method for accurately deploying marine sensors underwater according to claim 2, wherein after the global update in step 3, each set of control parameters $x_i$ has a probability of $p_a\in(0,1)$ to be locally update, and the update method of the local random walk is shown in the following formula:

$$x_i^{n+1}=x_i^{n+1}\epsilon\cdot(x_p^{n+1}-x_q^{n+1}), p,q=1,2,\ldots N$$

wherein $x_p$ and $x_q$ are two random solutions, $\epsilon$ conforms to an uniform distribution of an interval [0,1], and the superscript n+1 is the number of iterations in the next step.

14. A computer-readable storage medium, wherein the computer-readable storage medium stores a computer program, when the computer program is executed by a processor, the trajectory optimization method as claimed in claim 2 is implemented.

15. A trajectory optimization device for accurately deploying a marine sensor under water, comprising the computer-readable storage medium and the processor as claimed in claim 14, and the processor is configured for calling and processing computer programs stored in the computer-readable storage medium.

16. The trajectory optimization method for accurately deploying marine sensors underwater according to claim 3, wherein the sensor in the local body coordinate system is an axisymmetric slender body, and the change of an initial roll angle does not affect the movement of the slender body, therefore, the initial roll angle and an initial immersion depth are as follows:

$$\phi_0=0$$

$$d=-L/2\sin(\theta_0)$$

thus, the initial control variable is simplified as $x=(U_0, V_0, W_0, \omega_{x0}, \omega_{y0}, \omega_{z0}, \theta_0, \psi_0)$, and L represents the length of the sensor.

17. The trajectory optimization method for accurately deploying marine sensors underwater according to claim 3, wherein in step 3, a global random walk is performed through Lévy flight, and global update is performed for N sets of control parameters $x_i$, as shown in the following formula:

$$x_i^{n+1}=x_i^n+\alpha\otimes\text{Lévy}(s,\lambda)$$

in the formula, $\alpha=\alpha_0(x_j^t-x_i^t)$, $\alpha_0$ is a preset constant, $x_j$ represents the j-th set of control parameters x that is randomly generated, s represents the step length of the iterative operation, $\otimes$ stands for item-based multiplication, and $\lambda$ is an exponent of a Lévy distribution.

18. The trajectory optimization method for accurately deploying marine sensors underwater according to claim 3, wherein after the global update in step 3, each set of control parameters $x_i$ has a probability of $p_a\in(0,1)$ to be locally update, and the update method of the local random walk is shown in the following formula:

$$x_i^{n+1}=x_i^{n+1}+\epsilon\cdot(x_p^{n+1}-x_q^{n+1}), p,q=1,2,\ldots N$$

wherein $x_p$ and $x_q$ are two random solutions, $\epsilon$ conforms to an uniform distribution of an interval [0,1], and the superscript n+1 is the number of iterations in the next step.

19. A computer-readable storage medium, wherein the computer-readable storage medium stores a computer program, when the computer program is executed by a processor, the trajectory optimization method as claimed in claim 3 is implemented.

20. A trajectory optimization device for accurately deploying a marine sensor under water, comprising the computer-readable storage medium and the processor as claimed in claim 19, and the processor is configured for calling and processing computer programs stored in the computer-readable storage medium.

\* \* \* \* \*